United States Patent
Shiota et al.

(10) Patent No.: US 7,106,761 B2
(45) Date of Patent: Sep. 12, 2006

(54) MULTIPLEXING METHOD AND APPARATUS SUITABLE FOR TRANSMISSION OF OVERHEAD DATA ARRIVING FROM MANY COMMUNICATION LINES

(75) Inventors: Kazunari Shiota, Fukuoka (JP); Hidetoshi Kawamura, Fukuoka (JP); Seiji Miyahara, Fukuoka (JP); Isao Takata, Fukuoka (JP); Kanji Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 891 days.

(21) Appl. No.: 10/075,853

(22) Filed: Feb. 13, 2002

(65) Prior Publication Data

US 2002/0085593 A1 Jul. 4, 2002

Related U.S. Application Data

(63) Continuation of application No. PCT/JP99/05496, filed on Oct. 5, 1999.

(51) Int. Cl.
*H04J 3/02* (2006.01)

(52) U.S. Cl. .................. 370/537; 370/419; 370/301

(58) Field of Classification Search .............. None
See application file for complete search history.

(56) References Cited

U.S. PATENT DOCUMENTS 5,940,456 A * 8/1999 Chen et al. ............... 375/356

6,094,430 A * 7/2000 Hoogenboom ............. 370/375
6,556,568 B1 * 4/2003 Sasaki ..................... 370/395.1

FOREIGN PATENT DOCUMENTS

| JP | 59-178034 | 10/1984 |
| JP | 01046336 | 2/1989 |
| JP | 5-344091 | 12/1993 |
| JP | 06-022287 | 1/1994 |
| JP | 07050648 | 2/1995 |
| JP | 9-18843 | 1/1997 |

OTHER PUBLICATIONS

Japanese Office Action dated May 24, 2005.
Kennteth R. Sites, et al.. An Asynchronous 20-Channel Digital Multiplexer/Demultiplexer System for Transmission on a single 10 Kilometer Fiber-Optic Link, Proceedings of the 34th International Instrumentation Symposium, vol. 34 1988, pp. 97-109.

* cited by examiner

*Primary Examiner*—Bob A. Phunkulh
(74) *Attorney, Agent, or Firm*—Katten Muchin Rosenman LLP

(57) ABSTRACT

Data arriving from a plurality of channels asynchronously to each other are respectively stored in separate FIFOs (10). A controller (12) monitors the status of the FIFOs (10), retrieves the stored data in a predetermined order, and multiplexes the data, together with timing data indicating the presence or absence of the data, into a serial signal having a frame structure in which time slots are fixedly assigned to the respective channels. On the serial data, the same value appears successively as data, and when the data is valid, the corresponding timing data changes from a 0 to a 1. When the data is invalid, the value of the corresponding timing data does not change.

6 Claims, 14 Drawing Sheets

Fig.2

| FIFO STATUS | DATA PRESENCE | | DATA ABSENCE | |
|---|---|---|---|---|
| | FIRST BIT | SECOND BIT | FIRST BIT | SECOND BIT |
| DATA | 1(0) | 1(0) | × | × |
| DATA TIMING | 0 | 1 | 0 | 0 |

MULTIPLEXING METHOD AND APPARATUS SUITABLE FOR TRANSMISSION OF OVERHEAD DATA ARRIVING FROM MANY COMMUNICATION LINES

CROSS-REFERENCE TO RELATED APPLICATIONS

This application is a continuation of PCT/JP99/05496 filed Oct. 5, 1999.

TECHNICAL FIELD

The present invention relates to a method and apparatus for multiplexing data from a plurality of input channels that can differ in data phase and/or bit rate, and, more particularly, to a method and apparatus for multiplexing overhead data arriving from many different communication lines.

BACKGROUND ART

Trunk transmission equipment conforming to the SONET/SDH standards is being installed in trunk transmission lines. In this type of equipment, overall unit size has been decreasing because of the use of large-scale ASICs and the reduced size of the optical modules. Further, the demand for higher transmission capacity is driving the need to increase the line accommodating capacity per piece of equipment (shelf). For these reasons, and for purposes of achieving efficient line switching control, termination control of overhead information (especially, APS (Auto Protection Switch) information as switching information) arriving from many different lines is being managed centrally.

In this case, overhead data from a plurality of lines are concentrated and terminated at one overhead data terminating block where APS, DCC (Data Communication Channel), OW (Order Wire), etc. are separated. Of these, DCC, OW, etc. are all supplied to a lower-order processing block for processing. Accordingly, as the number of signal lines between the overhead data terminating block and the lower-order processing block becomes enormous as the number of accommodated lines increases, the number of signal lines must be reduced by multiplexing the signals. Reduction in the number of signal lines is mandatory particularly when the overhead data terminating block is implemented on one ASIC, because there is a limit on the number of pins on the LSI.

On the other hand, as the data phases of the DCC and OW signals contained in the overheads from the different lines are asynchronous between the lines, if they are multiplexed as they are, processing at the receiving end will become complex, resulting in the problem that the amount of circuitry increases.

Furthermore, in the case of DCC, not only the data phase but also the bit rate may differ. In such a case, if signals of the same bit rate are multiplexed together, as many signal lines as the number of bit rates used would become necessary.

DISCLOSURE OF THE INVENTION

Accordingly, it is an object of the present invention to achieve a method and apparatus with simple circuitry that can multiplex together many signals possibly differing in data phase and/or bit rate.

According to the present invention, there is provided a method for multiplexing data from a plurality of input channels that can differ in data phase and/or bit rate into a serial signal, comprising the steps of: storing the data, respectively arriving from the plurality of input channels, into separate memories respectively; and retrieving the data from the respective memories in a predetermined order, and multiplexing the data, together with timing data indicating the presence of the data, into a serial signal of a frame structure having time slots fixedly assigned to the respective input channels.

According to the present invention, there is also provided a multiplexing apparatus for multiplexing data from a plurality of input channels that can differ in data phase and/or bit rate into a serial signal, comprising: a plurality of memories for separately storing the data respectively arriving from the plurality of input channels; and a multiplexing block for retrieving the data from the respective memories in a predetermined order, and for multiplexing the data, together with timing data indicating the presence of the data, into a serial signal of a frame structure having time slots fixedly assigned to the respective input channels.

BRIEF DESCRIPTION OF THE DRAWINGS

FIG. 2 is a diagram for explaining a multiplexing method according to the present invention;

BEST MODE FOR CARRYING OUT THE INVENTION

Figure 1:
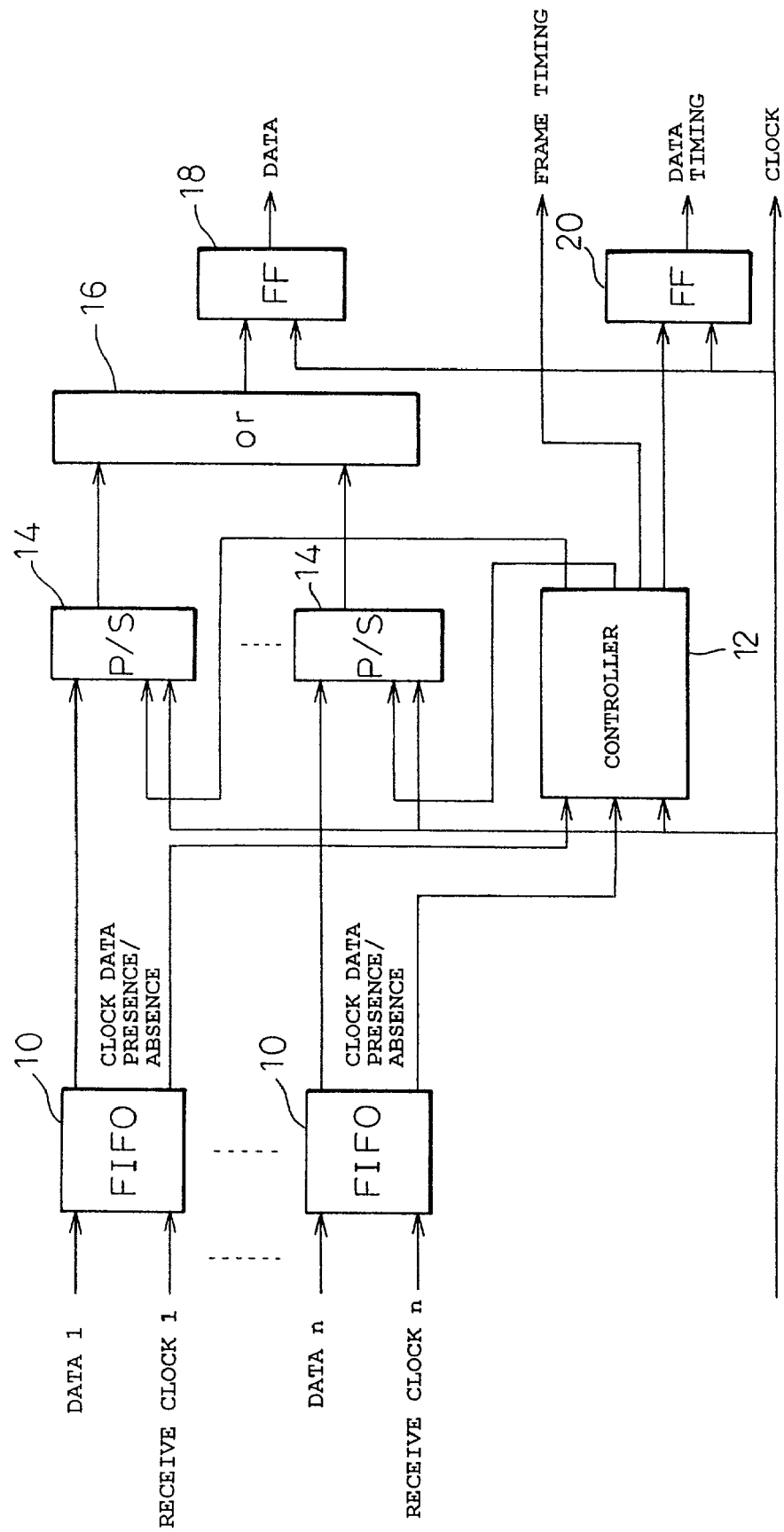
FIG. 1 is a circuit diagram of a multiplexing circuit according to one embodiment of the present invention.

FIG. 1 is a circuit diagram of a multiplexing circuit according to one embodiment of the present invention. In FIG. 1, n channels of data that can differ in data phase and/or bit rate are input to respective separate FIFOs (first-in first-out memories) 10 together with their respective receive clocks. The receive data from the n channels are temporarily stored in the respective FIFOs 10 in synchronism with the respective receive clocks 1 to n. Each FIFO 10 outputs a status signal indicating the presence or absence of data to a controller 12. The controller 12 operates synchronously with a clock that is independent of the receive clocks 1 to n, and outputs frame timing indicating the beginning of an output frame for every predetermined number of clocks. Further, the controller 12 scans the status signal outputs of the FIFOs 10 in a predetermined order and, if the presence of data is detected, causes the corresponding parallel/serial converter 14 to latch the data with the timing preassigned to its channel and to output serial data with the preassigned timing. As the timing is adjusted so that the serial signals output from the respective parallel/serial converters 14 will not overlap each other, the serial signals are multiplexed together by ORing them in an OR circuit 16. The controller 12 further outputs timing data indicating the timing of valid data on the serial signal. The data output from the OR circuit 16 and the timing data indicating the timing of the data are supplied to flip-flops 18 and 20, respectively, for shaping before being transmitted out.

In the illustrated example, the data and the timing data indicating the timing of the data are transmitted out on different lines; alternatively, the timing data may be output with timing that does not overlap the output timing of the data and be input to the OR circuit 16 where the timing data and the data are multiplexed together for transmission on one line.

For the timing data, multiple bits are output for one bit of input data, and for the data, the same number of bits of the same value are output. FIG. 2 shows an example in which two bits of data and timing data are output for one bit of input data. In FIG. 2, when valid data is output, a 0 and a 1 are respectively output as the first and second bits of the timing data, while bits of the same value as the input data, that is, 1 or 0, are output as the first and second bits of the output data. When invalid data is output, 0s are output as the first and second bits of the timing data.

Considering the convenience of the receiving side, when transmitting the data and the timing data on different lines, preferably, the timing is determined so that the first bits and the second bits of the data and the timing data, respectively, will appear on the respective serial signals at intervals equal to the number of input channels. When multiplexing the timing data with the data, the timing is determined so that the first bits and the second bits respectively will appear on the serial signal at intervals equal to an integer multiple of the number of input channels.

Figure 3:
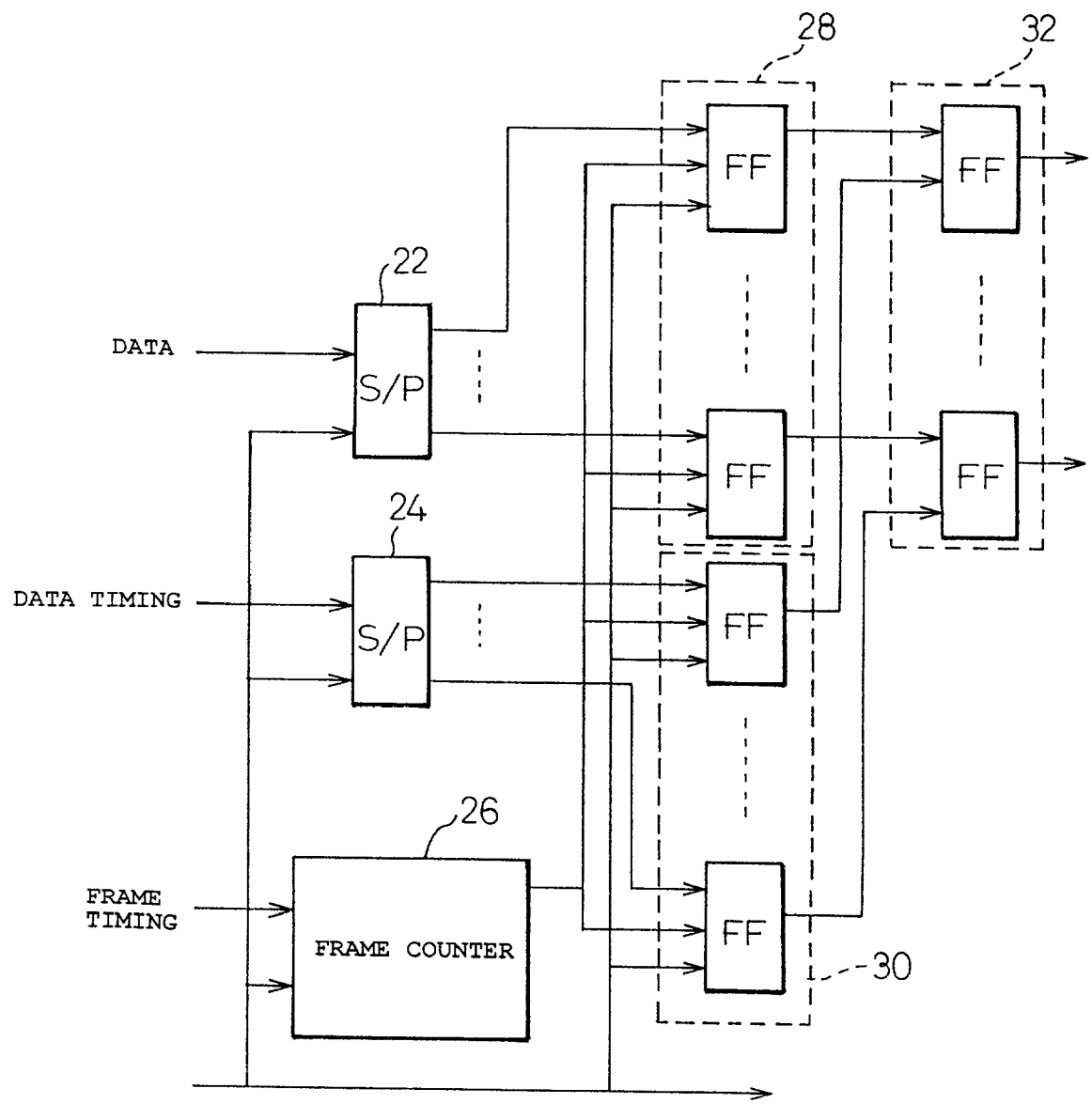
FIG. 3 is a diagram showing one example of a circuit at the receiving end.
Figure 4:
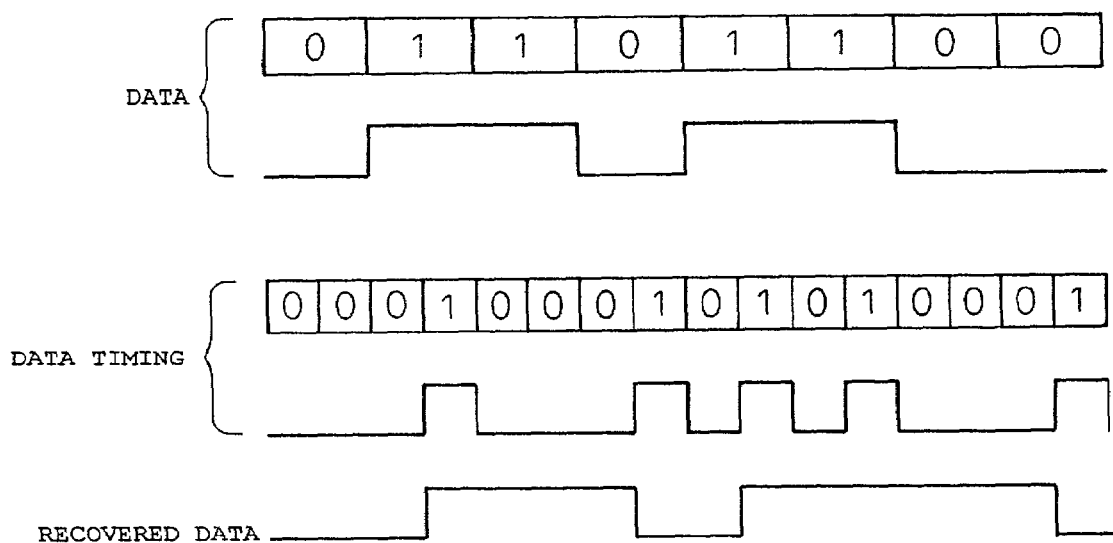
FIG. 4 is a diagram for explaining data recovery at the receiving end.

FIG. 3 shows one example of a circuit at the receiving end. The data and the timing data are demultiplexed into the data and the timing data for the respective channels by inputting the data and the timing data into respective serial/parallel converters 22 and 24 each of which converts the serial signal into a parallel signal of the same number of bits as the number of channels. A frame counter 26 counts the number of clocks by reference to a signal indicating the frame timing, and outputs a pulse for every n input clocks where n is equal to the number of input channels. Flip-flops 28, the number of which is equal to the number of input channels, latch the outputs of the serial/parallel converter 22 by the pulse output from the frame counter 26 and output the data for the respective channels. Likewise, flip-flops 30, the number of which is also equal to the number of channels, latch the outputs of the serial/parallel converter 24 by the output pulse of the frame counter 26 and output the timing data for the respective channels. In flip-flops 32, the data for the respective channels are latched by the timing data for the respective channels, thereby recovering the data as shown in FIG. 4.

In the present invention, the plurality of input data running asynchronous to each other are temporarily stored in the respective FIFOs 10 in FIG. 1, and are multiplexed together using the timing generated by the controller 12, thereby accommodating the phase differences among the plurality of data running asynchronous to each other. For any input channel designed as unused, the monitoring by the controller 12 is disabled to prevent data from being latched into its corresponding P/S converter 14, so that only the selected data streams can be multiplexed. Further, since each bit of data is multiplexed together with the timing data indicating the presence or absence of data, if the bit rate differs significantly among the input channels, the data streams can be multiplexed into a single serial data stream. Moreover, when the number of bits represented by 1-bit data is set in the controller on a channel-by-channel basis, not only can the clock rate, when recovered, be brought close to that of the original signal, but the duty ratio can also be adjusted for each channel.

Figure 5:
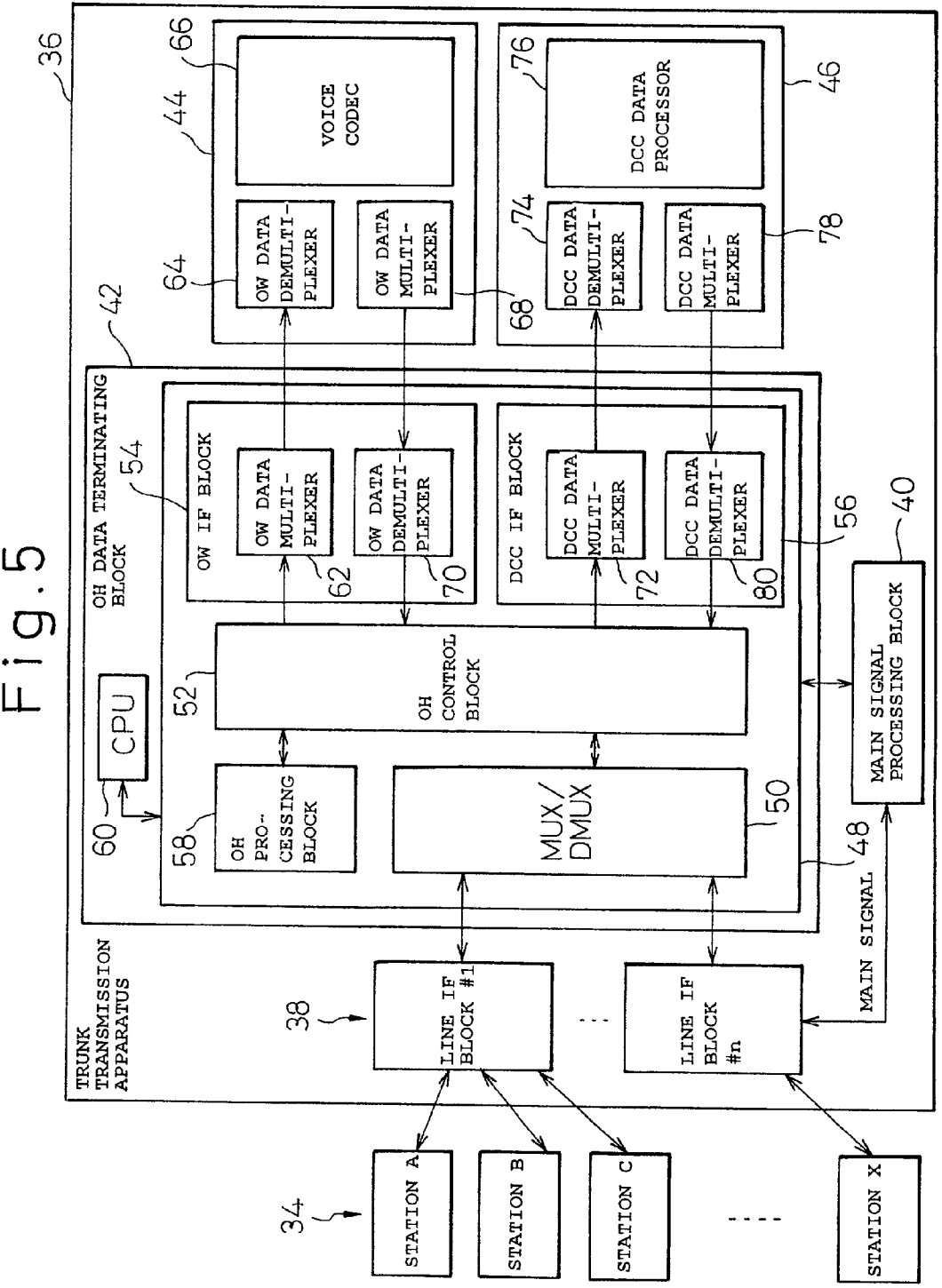
FIG. 5 is a block diagram showing the configuration of a trunk transmission apparatus to which the present invention is applied.

FIG. 5 shows the configuration of a trunk transmission apparatus that uses the multiplexing method and apparatus of the present invention.

In FIG. 5, remote stations 34 and the trunk transmission apparatus 36 accommodating the plurality of lines from the remote stations 34 are shown. The trunk transmission apparatus 36 contains line interface blocks 38, a main signal processing block 40, an overhead (hereinafter abbreviated OH) data terminating block 42, and OW and DCC units 44 and 46. The apparatus 36 is equipped with a maximum number, n, of line interface blocks 38, and different kinds of cards can be mounted as desired in the line interface blocks 38 according to the type of line served. The OH data terminating block 42 is responsible for collecting and delivering various kinds of control information as well as terminating the OH information received from the respective line interface blocks 38 and the main signal processing block 40. The following description is given by taking as an example the termination of the OW information and DCC information among the OH data to be terminated. Of the information extracted by the OH data terminating block 42, the OW information and DCC information are transferred to the OW unit 44 and DCC unit 46, respectively, for data termination. In the example shown in FIG. 5, the block/unit interface in the OH data terminating block 42 is implemented as a one-chip ASIC (hereinafter called the OH-ASIC 48). In the OH-ASIC 48, the serial data multiplexed into a frame and transferred from each of the plurality of line interface blocks 38 is demultiplexed by a MUX/DMUX block 50 to extract the OH data. Of the extracted OH data, the OW data and DCC data are transferred to an OW IF block 54 and a DCC IF block 56, respectively, via an OH control block 52. On the other hand, those OH data (such as APS) which are to be terminated in resistors are transferred via the OH control block 52 to an OH processing block 58, and the data processed therein are presented to a CPU 60 for display.

The OW data for the plurality of channels, output from the OH control block 52, are multiplexed by an OW data multiplexer 62 in the OW IF block 54, and transferred as serial data to the OW unit 44. The transferred multiplexed data is demultiplexed by an OW data demultiplexer 64 into the original OW data, and the clock, timing, and data are recovered as voice data, and converted by an OW data/voice processor (voice codec) 66 into the voice data. In the reverse direction, the voice data is converted by the OW data/voice processor 66 into digital data, which is then transferred via an OW data multiplexer 68 and an OW data demultiplexer 70 in the OH-ASIC 48 and via the OH control block 52 to the MUX/DMUX block 50 where the data is multiplexed with other OH data into a frame for transmission as serial data to the designated line interface block 38. Likewise, the DCC data multiplexed by a DCC data multiplexer 72 is demultiplexed by a DCC data demultiplexer 74, and processed by a DCC data processor 76. The flow of the DCC data from the DCC data processor 76 to the line interface block 38 is the same as that for the OW data. Reference numeral 78 is a DCC data multiplexer, and 80 is a DCC data demultiplexer.

The operation of the various blocks will be described below for the case where four channels of asynchronous OW data are transferred from the OW IF block 54 to the OW unit 44.

Figure 6:
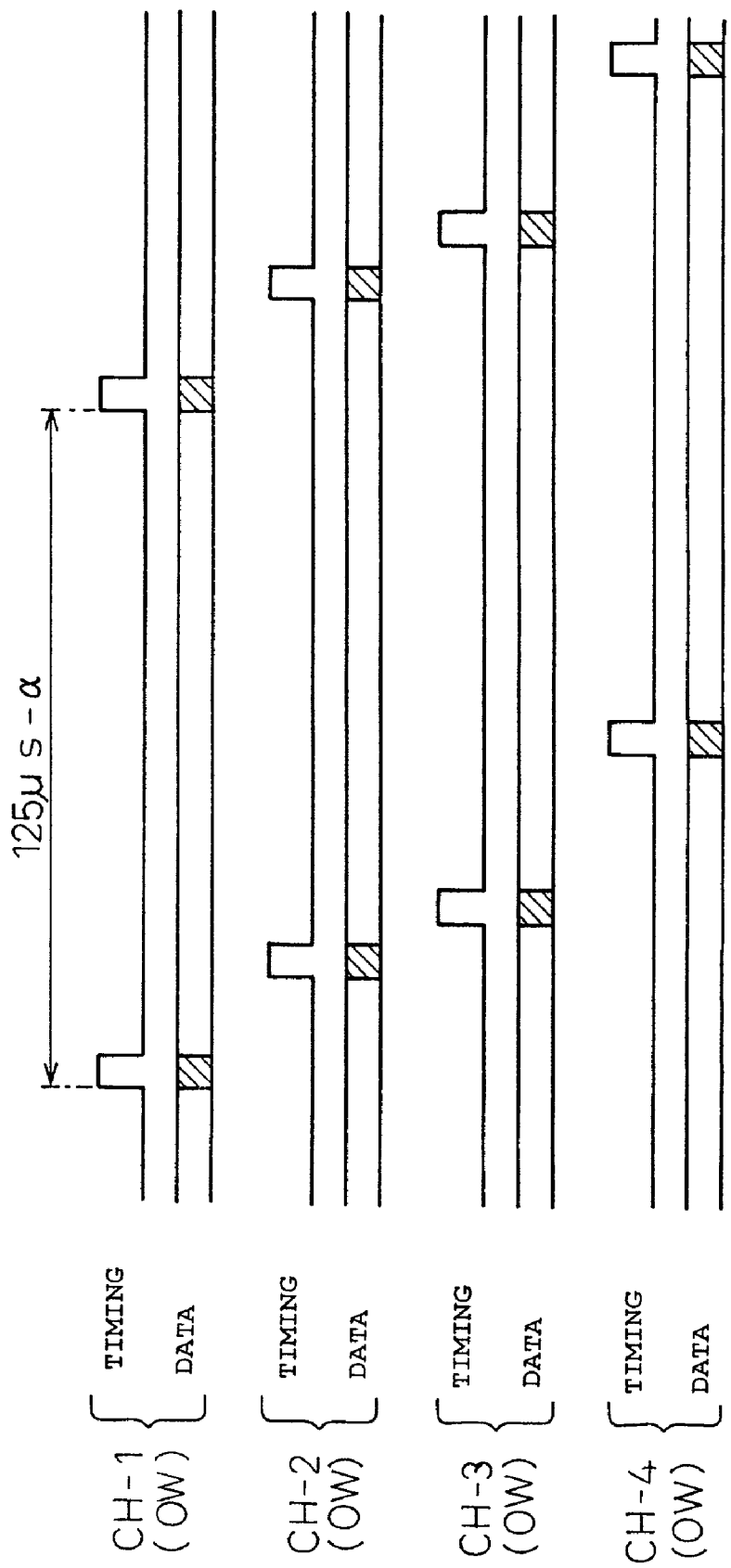
FIG. 6 is a diagram showing OW data asynchronously input from a plurality of channels.
Figure 7:
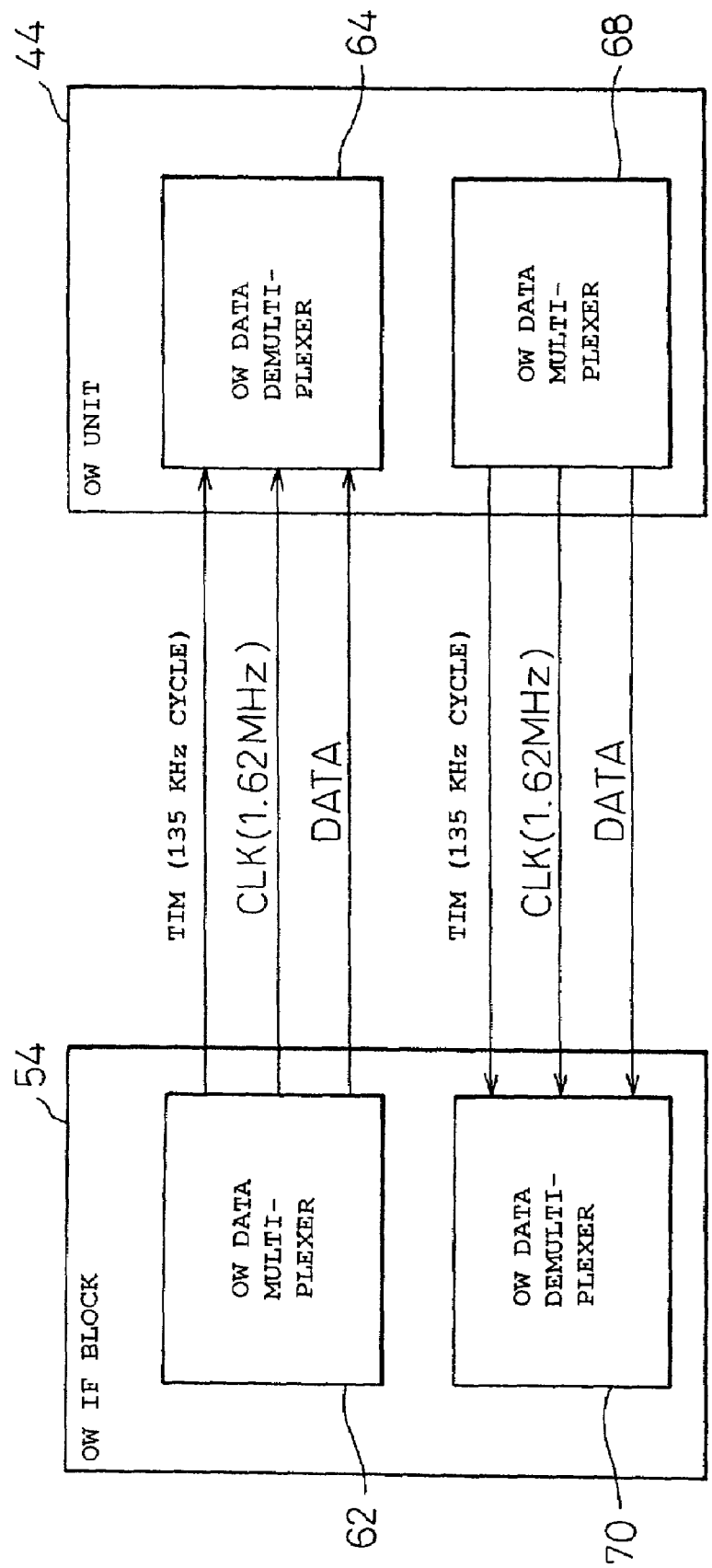
FIG. 7 is a diagram showing the interface between an OW IF block 54 and an OW unit 44.

The OH data received from the different stations are asynchronous to each other, and the OW data for the respective channels, output from the OH control block 52, are also asynchronous to each other, as shown in FIG. 6. FIG. 7 shows the interface between the OW IF block 54 and the OW unit 44, FIG. 8 shows the timing and data format of interface signals, and FIG. 9 shows the circuit configuration of the OW data multiplexer 62 or 68.

As shown in FIG. 6, the OW data for each channel, output from the OH control block 52, is 8-bit data whose interval is slightly shorter than 125 μsec. The OW data for the respective channels (in the illustrated example, four channels ch-1 to ch-4) are written to respective FIFOs 80 (FIG. 9) in synchronism with the timing signals of the respective channels also output from the OH control block 52. Based on the multiplexing clock CLK and multiplexing timing TIM generated from the base clock by a CLK generator 82 and a TIM generator 84 respectively, a data control block 86 reads the data written to the FIFOs 80 and multiplexes them into a frame of the format shown in FIG. 8.

Figure 8:
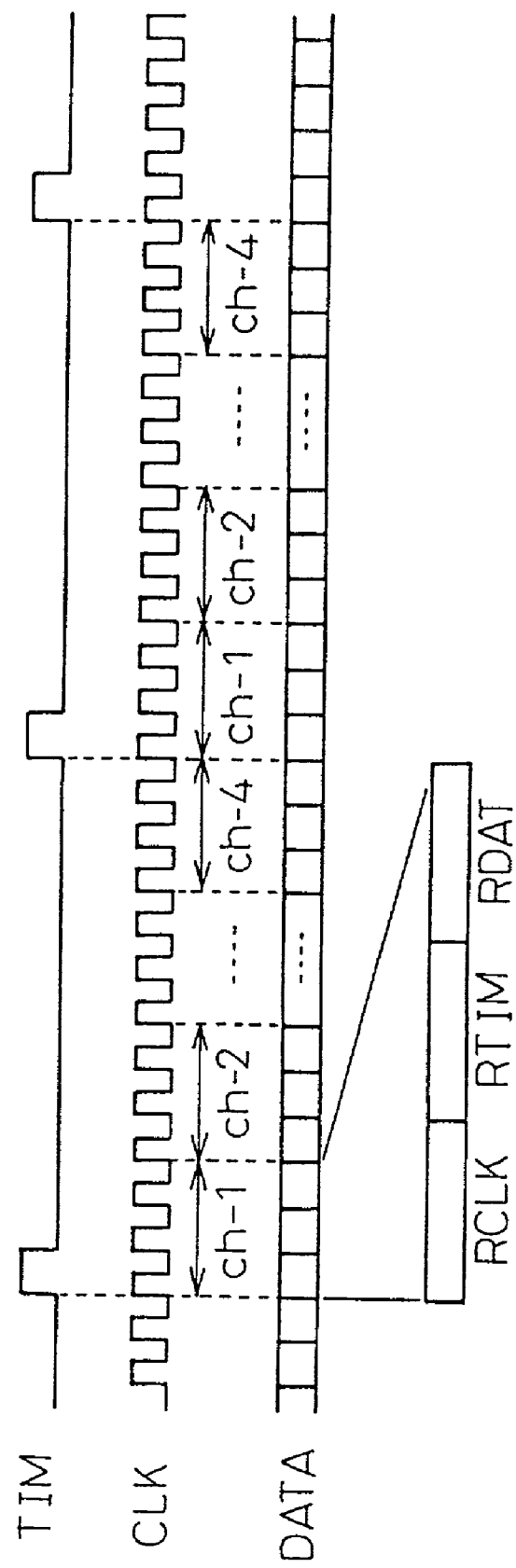
FIG. 8 is a timing chart showing the timing and data format of interface signals.
Figure 9:
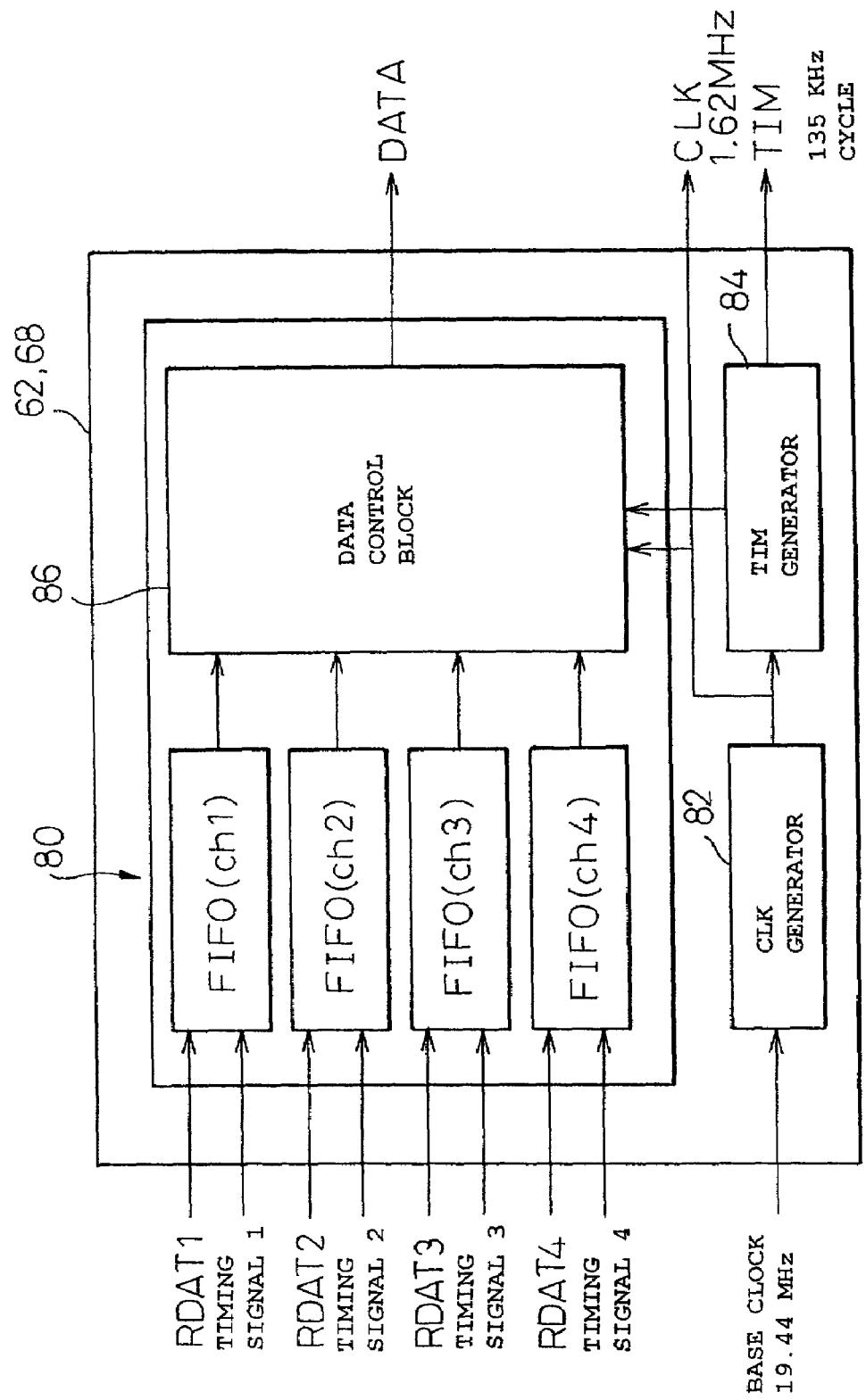
FIG. 9 is a block diagram showing the configuration of an OW data multiplexer 62 or 68.

In FIG. 8, each frame defined by TIM consists of (number of channels×3) bits, and three time slots, "RCLK", "RTIM", and "RDAT", are provided for each channel. When there is data on a channel, the value of the data is stored in RDAT for that channel in two successive frames, while "0" is stored in RCLK in the first frame and "1" in RCLK in the second frame. When there is no data on a channel, then "1" is stored in RCLK for that channel in two successive frames.

More specifically, of the two examples explained with reference to FIG. 1, the multiplexing of the OW signals shown in FIGS. 7 and 8 corresponds to the example of multiplexing the data and its timing data into the same serial signal, and RDAT corresponds to the data while RTIM corresponds to the timing data. RTIM indicates a byte boundary; when the bit is one of the four high-order bits of OW, "0" is stored in RTIM, and when the bit is one of the four low-order bits of OW, "1" is stored in RTIM. When there is no data, "1" is stored in RTIM.

Figure 10:
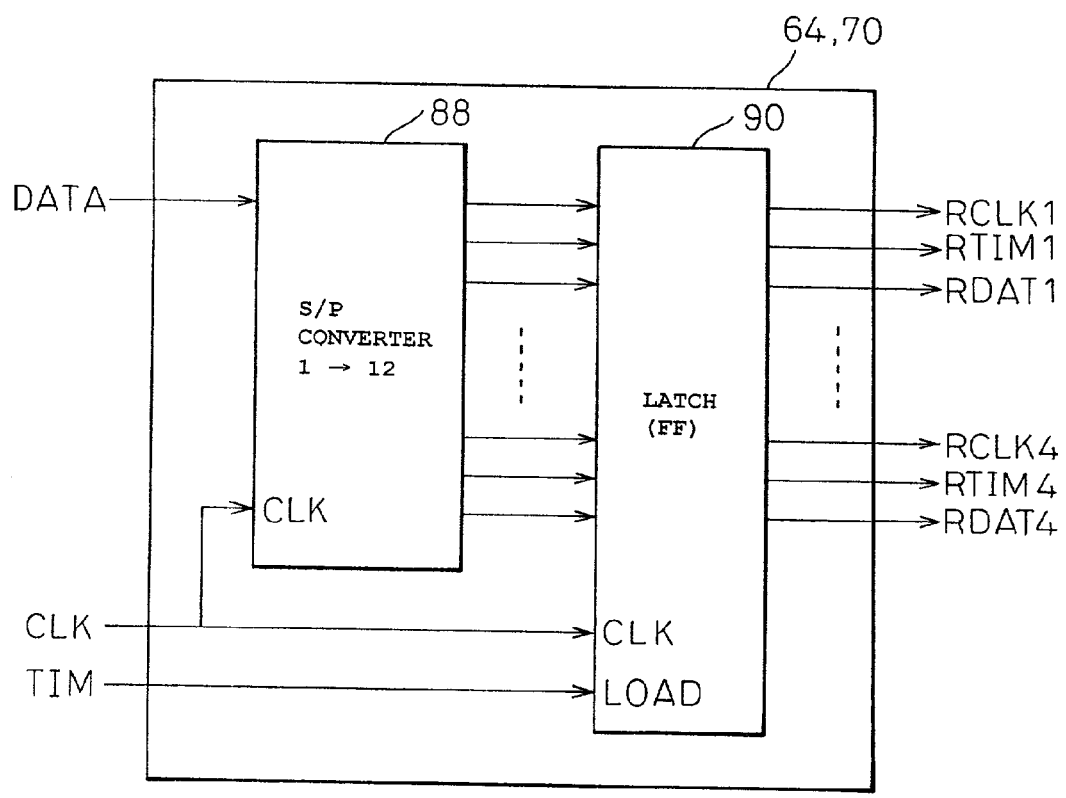
FIG. 10 is a circuit diagram of an OW data demultiplexer 64 or 70.

FIG. 10 shows the circuit configuration of the OW data demultiplexer 64 or 70. A one-frame (in the illustrated example, 12-bit) signal is converted by a serial/parallel converter 88 into a parallel signal which is latched into a latch 90 by the timing of TIM, to obtain RCLK, RTIM, and RDAT for the respective channels.

In the present embodiment, the OH data for four channels are multiplexed for transfer between the OH ASIC and the OW unit, but the number of channels to be multiplexed need not be limited to four; rather, any number of channels selected from among the channels existing in the line interface block can be multiplexed.

Next, the operation of the various blocks will be described for the case where 20 channels of asynchronous DCC data are transferred from the DCC IF block 56 to the DCC unit 46.

Figure 11:
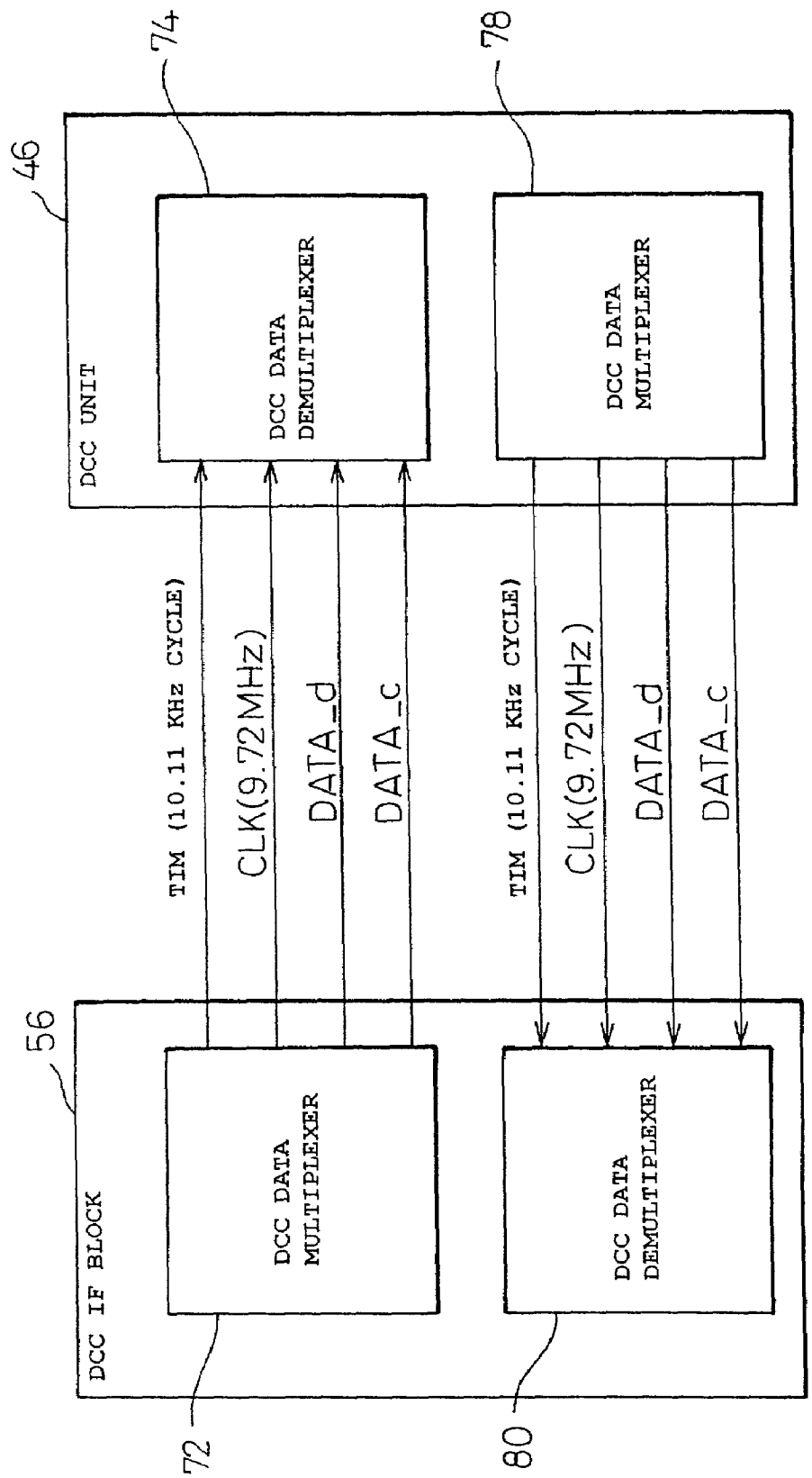
FIG. 11 is a diagram showing the interface between a DCC IF block 56 and a DCC unit 46.
Figure 12:
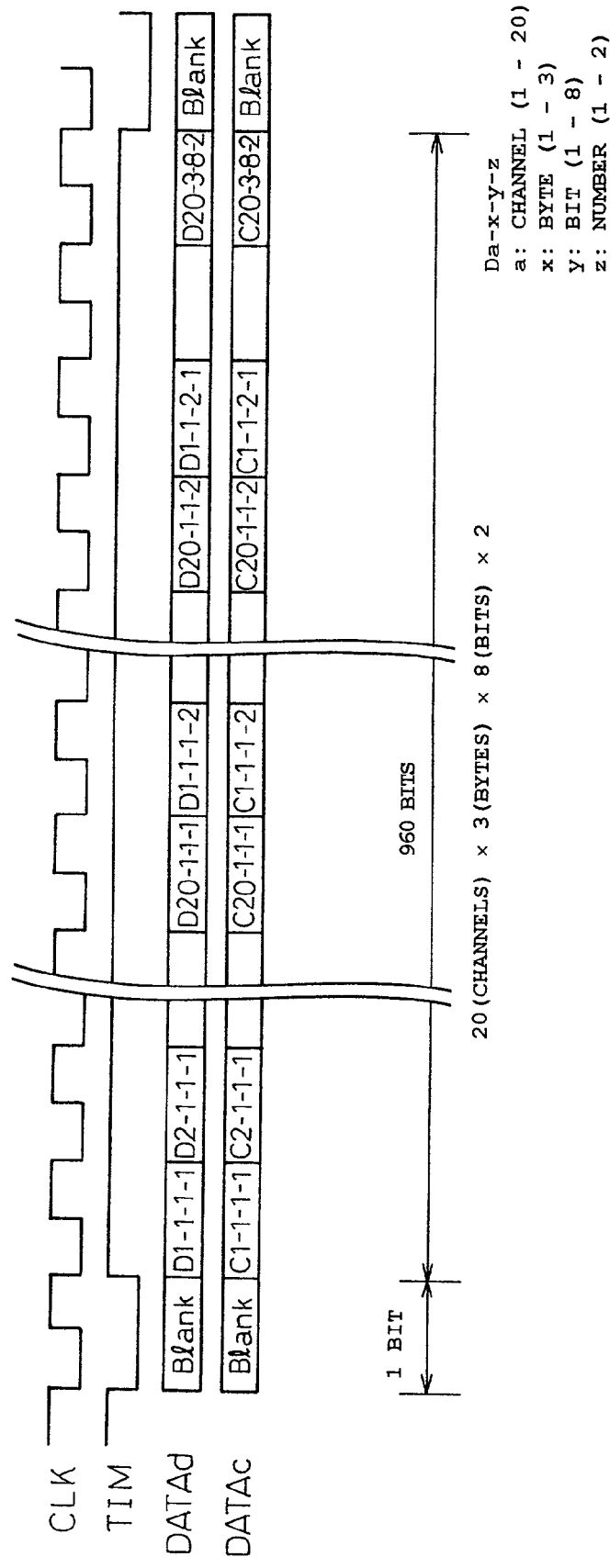
FIG. 12 is a timing chart showing the timing and data format of interface signals.
Figure 13:
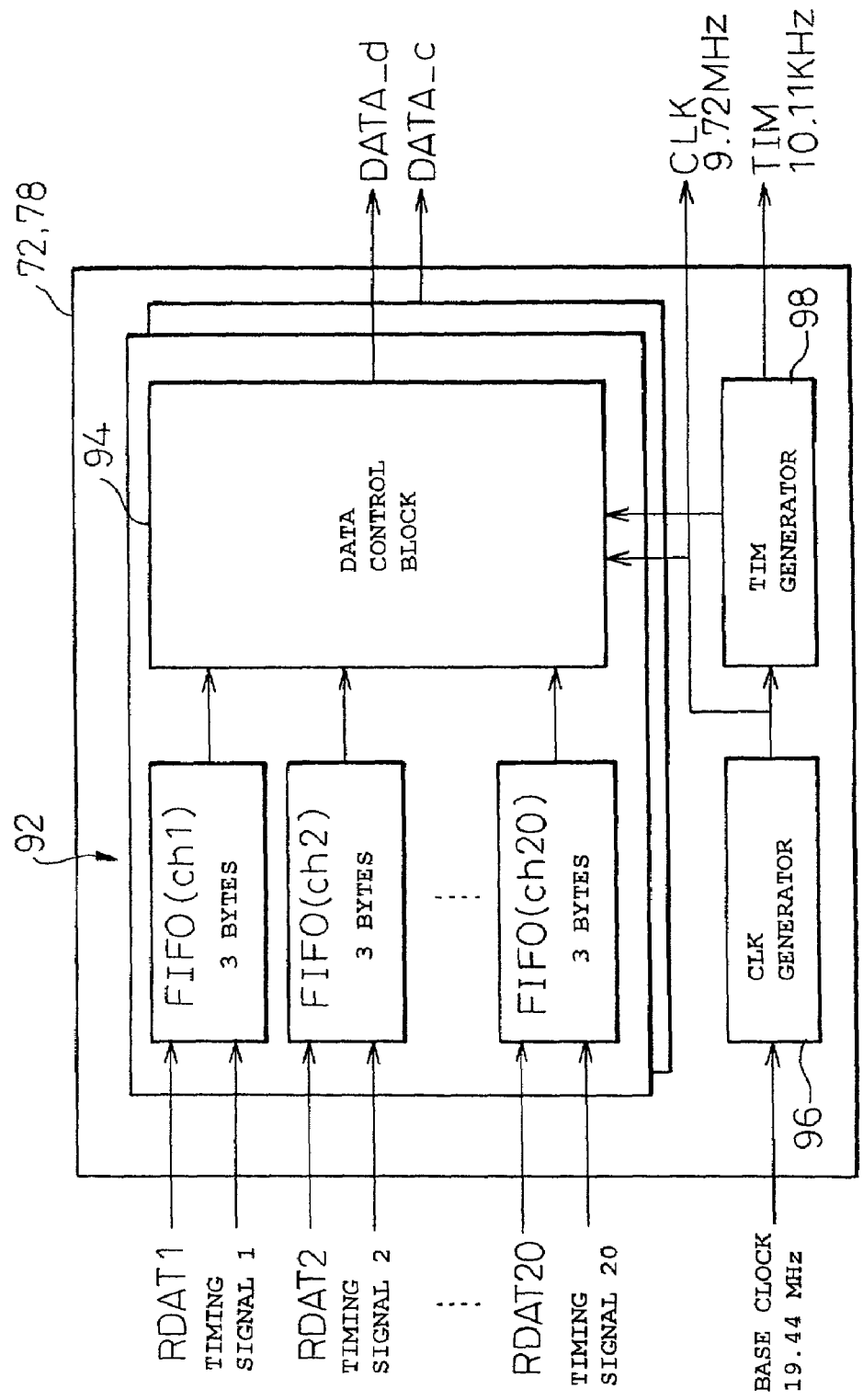
FIG. 13 is a diagram showing the circuit configuration of a DCC data multiplexer 72 or 78.

The OH data received from the different stations are asynchronous to each other, and the DCC data for the respective channels, output from the OH control block 52, are also asynchronous to each other, as in the case of the OW data. Here, FIG. 11 shows the interface between the DCC IF block 56 and the DCC unit 46, FIG. 12 shows the time chart and data format of interface signals, and FIG. 13 shows the circuit configuration of the DCC data multiplexer 72 or 78. In the multiplexing of the DCC data, the data component and the clock component are multiplexed as separate serial data streams on DATA_d and DATA_c signals, respectively, as shown in FIGS. 11 and 12.

More specifically, of the two examples explained with reference to FIG. 1, the multiplexing of the DCC data in the present embodiment corresponds to the example of multiplexing the data and its timing data on separate serial signals, and DATA_d corresponds to the data while DATA_c corresponds to the timing data.

Each frame of each input channel contains 3-byte DCC in the case of section DCC, and these bytes are temporarily stored in the corresponding FIFO 92 (FIG. 13). Based on the CLK and TIM generated from the base clock by a CLK generator 96 and a TIM generator 98 respectively, a data control block 94 reads the data stored in the FIFOs 92 and multiplexes them into a frame of the format shown in FIG. 12.

In FIG. 12, DATA_d and DATA_c each contain one-bit blank and 960 bits of data within one frame defined by TIM. The data part of DATA_d begins at the first bit of bit 1 of the first byte (D1 byte) of the DCC data for the first channel (D1-1-1-1), followed by the first bit of bit 1 of the D1 byte for the second channel (D2-1-1-1). The first bit of bit 1 of the D1 byte for the 20th channel (D20-1-1-1) is followed by the second bit of bit 1 of the D1 byte for the first channel (D1-1-1-2). The frame ends at the second bit of bit 8 of the D3 byte for the 20th channel.

When the D1 byte for the first channel exists, the value of the first bit of the D1 byte is stored in the positions of D1-1-1-1 and D1-1-1-2, and "0" and "1" are stored in C1-1-1-1 and C1-1-1-2, respectively. When the D1 byte for the first channel does not exist, "0" is stored in both C1-1-1-1 and C1-1-1-2. Likewise, when the data of Dx byte for the a-th channel exists (a=1 to 12, x=1 to 3), the value of bit y (y=1 to 8) of that byte is stored in Da-x-y-1 and Da-x-y-2, and "0" and "1" are stored in Ca-x-y-1 and Ca-x-y-2, respectively. When the data of Dx byte for the a-th channel does not exist, "0" is stored in both Ca-x-y-1 and Ca-x-y-2.

In this way, as each bit of data is accompanied by its timing data, if the bit rate of the DCC data differs among the respective channels, the data can be multiplexed into the format described above.

Figure 14:
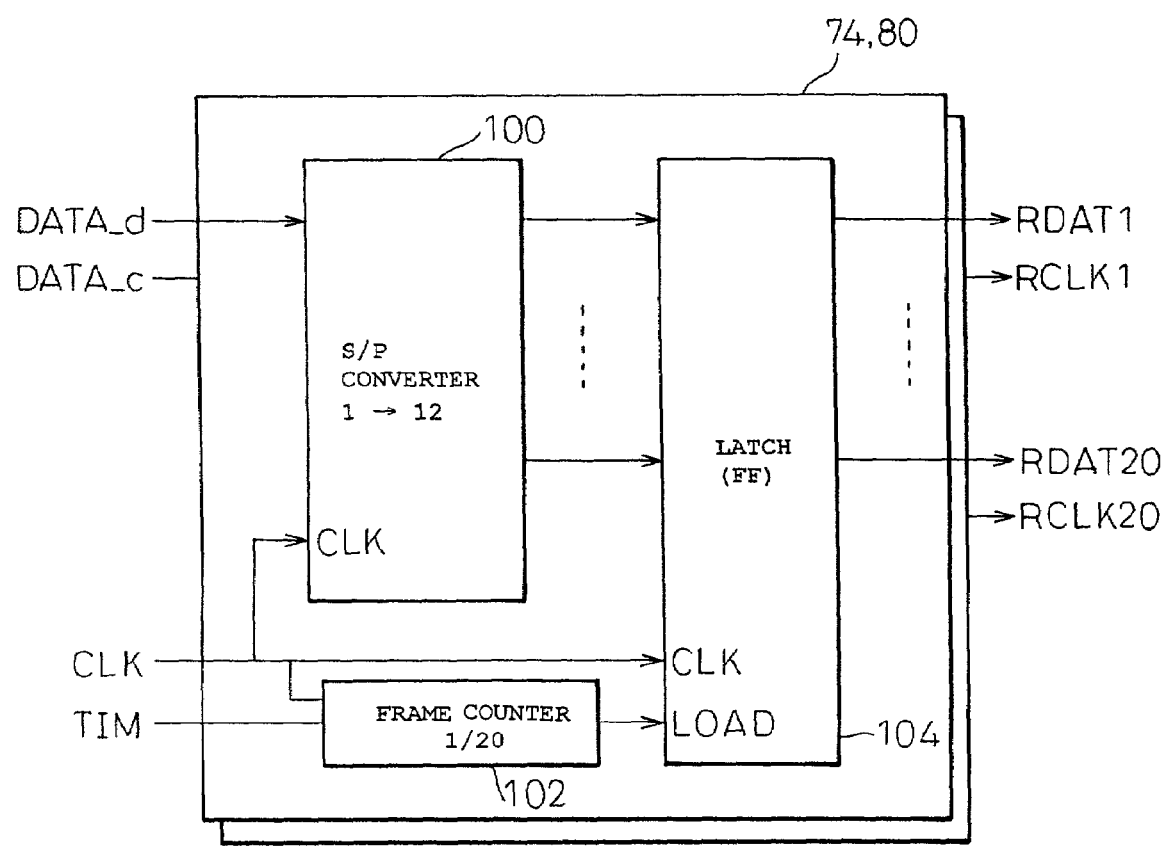
FIG. 14 is a block diagram showing the configuration of a DCC data demultiplexer 74 or 80.

FIG. 14 shows the circuit configuration of the DCC data demultiplexer 74 or 80. A serial/parallel converter 100 converts a serial signal of contiguous 20 bits into a parallel signal. A frame counter 102 outputs a pulse for every 20th count of CLK by reference to the timing of TIM. By latching the outputs of the serial/parallel converter 100 into a latch 104 by the thus output pulse, the data for the respective channels are demultiplexed. The circuit of the same configuration is provided for each of DATA_d and DATA_c, to recover the data and the data timing for the respective channels.

In the above example, the number of channels has been described as being 20, but it is to be understood that the example is illustrative only, and that modifications can be easily made so as to multiplex DCC data from any required number of channels.

The invention claimed is:

1. A method for multiplexing data from a plurality of input channels that can differ in data phase and/or bit rate into a serial signal comprising the steps of:
   storing the data, respectively arriving from the plurality of input channels, into separate memories respectively; and
   retrieving data from the respective memories in a predetermined order, and multiplexing the data, together with timing data indicating the presence of the data, into a serial signal of a frame structure having time slots fixedly assigned to the respective input channels,
   wherein a plurality of first bit storing positions and the same number of second bit storing positions are assigned for one bit of data, and the same value as the value of the data is stored in each of the plurality of first bit storing positions while, in the plurality of second bit storing positions, timing data whose value changes is stored when the data exists, but timing data whose value does not change is stored when the data does not exist.

2. A method according to claim 1, wherein
   the data from the plurality of input channels are order wire data from a plurality of communication lines, and
   the serial signal having the frame structure consists of a single serial signal, and wherein
   the data are multiplexed in such a manner that respective ones of the plurality of first bit storing positions and respective ones of the plurality of second bit storing positions appear on the serial signal at intervals equal to an integer multiple of the number of input channels.

3. A method according to claim 1, wherein
   the data from the plurality of input channels are data communication channel data from a plurality of communication lines, and
   the serial signal having the frame structure consists of a first serial signal for carrying the data and a second serial signal for carrying the timing data, and wherein
   the data are multiplexed in such a manner that respective ones of the plurality of first bit storing positions and respective ones of the plurality of second bit storing positions appear on the first serial signal and the second serial signal, respectively, at intervals equal to the number of input channels.

4. An apparatus for multiplexing data from a plurality of input channels that can differ in data phase and/or bit rate into a serial signal, comprising:
   a plurality of memories for separately storing the data respectively arriving from the plurality of input channels; and
   a multiplexing block for retrieving the data from the respective memories in a predetermined order, and for multiplexing the data, together with timing data indicating the presence of the data, into a serial signal of a frame structure having time slots fixedly assigned to the respective input channels,
   wherein a plurality of first bit storing positions and the same number of second bit storing positions are assigned for one bit of data, and the same value as the value of the data is stored in each of the plurality of first bit storing positions while, in the plurality of second bit storing positions, timing data whose value changes is stored when the data exists, but timing data whose value does not change is stored when the data does not exist.

5. An apparatus according to claim 4, wherein
   the data from the plurality of input channels are order wire data from a plurality of communication lines, and
   the serial signal having the frame structure consists of a single serial signal, and wherein
   the data are multiplexed in such a manner that respective ones of the plurality of first bit storing positions and respective ones of the plurality of second bit storing positions appear on the serial signal at intervals equal to an integral multiple of the number of input channels.

6. An apparatus according to claim 4, wherein
   the data from the plurality of input channels are data communication channel data from a plurality of communication lines, and
   the serial signal having the frame structure consists of a first serial signal for carrying the data and a second serial signal for carrying the timing data, and wherein
   the data are multiplexed in such a manner that respective ones of the plurality of first bit storing positions and respective ones of the plurality of second bit storing positions appear on the first serial signal and the second serial signal, respectively, at intervals equal to the number of input channels.

* * * * *

UNITED STATES PATENT AND TRADEMARK OFFICE
CERTIFICATE OF CORRECTION

PATENT NO. : 7,106,761 B2  
APPLICATION NO. : 10/075853  
DATED : September 12, 2006  
INVENTOR(S) : Shiota et al.

It is certified that error appears in the above-identified patent and that said Letters Patent is hereby corrected as shown below:

On the Title page, and item 45

[*] Notice: Subject to any disclaimer, the term of this patent is extended or adjusted under 35 USC 154(b) by (891) days Delete the phrase "by 891" and insert -- by 938 days--

Signed and Sealed this

Twenty-seventh Day of February, 2007

JON W. DUDAS  
*Director of the United States Patent and Trademark Office*